(12) United States Patent
Kikkeri

(10) Patent No.: US 9,182,838 B2
(45) Date of Patent: Nov. 10, 2015

(54) DEPTH CAMERA-BASED RELATIVE GESTURE DETECTION

(75) Inventor: Harshavardhana N. Kikkeri, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 281 days.

(21) Appl. No.: 13/100,733

(22) Filed: May 4, 2011

(65) Prior Publication Data

US 2012/0268369 A1 Oct. 25, 2012

Related U.S. Application Data

(60) Provisional application No. 61/476,924, filed on Apr. 19, 2011.

(51) Int. Cl.
*G06F 3/033* (2013.01)
*G06F 3/038* (2013.01)
*G06F 3/0338* (2013.01)
*G06F 3/02* (2006.01)

(52) U.S. Cl.
CPC ...... *G06F 3/038* (2013.01); *G06F 3/02* (2013.01); *G06F 3/0338* (2013.01)

(58) Field of Classification Search
CPC .............. G09G 5/08; G09G 5/00; G06F 3/02; G06F 3/0338
USPC ........................................................ 345/157
See application file for complete search history.

(56) References Cited

U.S. PATENT DOCUMENTS

| | | | |
|---|---|---|---|
| 6,147,678 A * | 11/2000 | Kumar et al. ................. | 345/158 |
| 6,252,598 B1 * | 6/2001 | Segen ........................... | 715/863 |
| 6,563,514 B1 | 5/2003 | Samar | |
| 7,489,306 B2 | 2/2009 | Kolmykov-Zotov et al. | |
| 7,877,707 B2 | 1/2011 | Westerman et al. | |
| 2009/0160767 A1 * | 6/2009 | Sugaya et al. ................. | 345/157 |
| 2010/0027843 A1 | 2/2010 | Wilson | |
| 2010/0289825 A1 * | 11/2010 | Shin et al. ..................... | 345/667 |
| 2010/0295773 A1 * | 11/2010 | Alameh et al. ................ | 345/156 |
| 2011/0134114 A1 * | 6/2011 | Rais et al. ..................... | 345/419 |

FOREIGN PATENT DOCUMENTS

WO 2007/097548 A1 8/2007

OTHER PUBLICATIONS

Suzuki, et al., "Interface for Digital Notes Using Stylus Motions Made in the Air", Retrieved at <<http://www.iplab.cs.tsukuba.ac.jp/~suzuki/paper/kicss2007.pdf>>, 2007, pp. 6.

(Continued)

*Primary Examiner* — Towfiq Elahi
(74) *Attorney, Agent, or Firm* — Judy Yee; Micky Minhas

(57) ABSTRACT

The subject disclosure is directed towards using timing and/or relative depth data to reduce false positives in gesture detection within a depth-sensed region. Depth camera data is processed to position a cursor over a displayed representation of a control. If the user's hand hovers over the control for a threshold time period, and then changes hand depth a relative amount (e.g., pushes the hand forward a delta amount), an event is fired. The displayed representation of the control may change (e.g., enlarge) upon hovering. The relative depth may be computed based upon the depth when the user hand initially enters the control area. The relative depth may remain the same if the user pulls the hand away from the camera by tracking the maximum depth and firing the event when the maximum depth value minus the current depth value reaches a delta value.

20 Claims, 6 Drawing Sheets

(56) References Cited

OTHER PUBLICATIONS

Hirobe, et al., "Vision-based Input Interface for Mobile Devices with High-speed Fingertip Tracking", Retrieved at <<http://www.k2.t.u-tokyo.ac.jp/members/komuro/hirobe_uist2009.pdf>>, UIST '09, Oct. 4-7, 2009, Victoria, BC, Canada, pp. 2.

Du, et al., "A Virtual Keyboard Based on True-3D Optical ", Retrieved at <<http://www.comp.leeds.ac.uk/bmvc2008/proceedings/2005/papers/151/paper151.pdf>>, 2005, pp. 10.

* cited by examiner

DEPTH CAMERA-BASED RELATIVE GESTURE DETECTION

CROSS-REFERENCE TO RELATED APPLICATION

The present application claims priority to U.S. provisional patent application Ser. No. 61/476,924, filed Apr. 19, 2011.

BACKGROUND

Interacting with a computing device, such as a computer, game system or robot, without requiring an input device such as a keyboard, mouse, touch-sensitive screen or game controller, presents various challenges. In general this is accomplished by detecting user gestures and interpreting their meaning.

The conventional way in which users interact with computing devices is via user Interfaces that present options in the form of menus, lists, and icons. For such user interfaces when used in conjunction with gesture detection, user gestures need to be interpreted relative to a display of the user interface.

However, known contemporary detection and interpretation technology has a number of drawbacks. One such drawback includes false positives, in which a user triggers an action that the user did not intend to trigger.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which timing and/or relative depth is used to reduce false positives in gesture detection within a depth-sensed region. Depth data with respect to a depth-sensed region is processed to determine a first depth value based upon an object (e.g., user hand) being present in a sub-region that corresponds to a displayed representation of a control. If one or more criteria (e.g., timing and/or a relative depth change of the first and a second depth) are met with respect to gesture interaction in the depth-sensed region, an event is fired. The first depth value may be based upon an entry point of the object into the sub-region, and may be changed over time, such as if the user pulls the object/hand away from a depth camera that provides the depth data.

With respect to timing, the one or more criteria may include a hover time in which the object remains present in the sub-region. When the object is present in the sub-region, such as for the hover time, at least one visible property of the displayed representation of the control may be changed, e.g., to grow the control's perceived size.

In one aspect, a depth camera captures depth data, and a gesture detection mechanism processes the depth data to determine when to fire an event associated with a control based upon detecting a gesture. The gesture is detected upon reaching a delta change in relative gesture depth with respect to a displayed representation of the control. The gesture detection mechanism may include a timer, and the gesture detection mechanism may not consider the gesture as being detected until the timer reaches a hover time corresponding to hover-related interaction with the displayed representation of the control.

In one aspect, the gesture detection mechanism may track a maximum depth, such that the change in the relative depth comprises a difference between the maximum depth and a current depth. The control may comprise the component in the gesture detection mechanism that tracks the maximum depth. The control may comprise a keyboard having a plurality of keys, and the control may tracks depth data for any gesture made relative to each key.

In one aspect, hand position within a depth-sensed region is sensed and used to position a cursor, e.g., on a display screen or the like. If the cursor remains over a displayed representation of the control for a hover time, and if a depth value based upon the hand position changes a relative amount while the cursor continues to remain over the displayed representation of the control, an event is fired. The relative amount may be based on a first depth value and a second, current depth value. The first depth value may be based on the depth value that is sensed when the cursor position is over an area corresponding to the displayed representation of the control, and/or changed based upon the current depth value moving further away from the depth camera that provides the depth data. Multiple object tracking, such as of two hands, and/or changes in the hand depths at different times, may be used to fire events related to zoom, rotation, double-click, or the like.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards gesture-based input that significantly reduces false positives in gesture detection. In general, timing and/or relative depth sensing with respect to interaction with a displayed control allow a user to efficiently and quickly interact via gestures to make selections, without generating false positives.

It should be understood that any of the examples herein are non-limiting. For one, any computing device and/or electronic device, such as a personal computer, robot, television, game system, and so forth may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and interfacing with computing and/or electronic devices in general.

Figure 1:
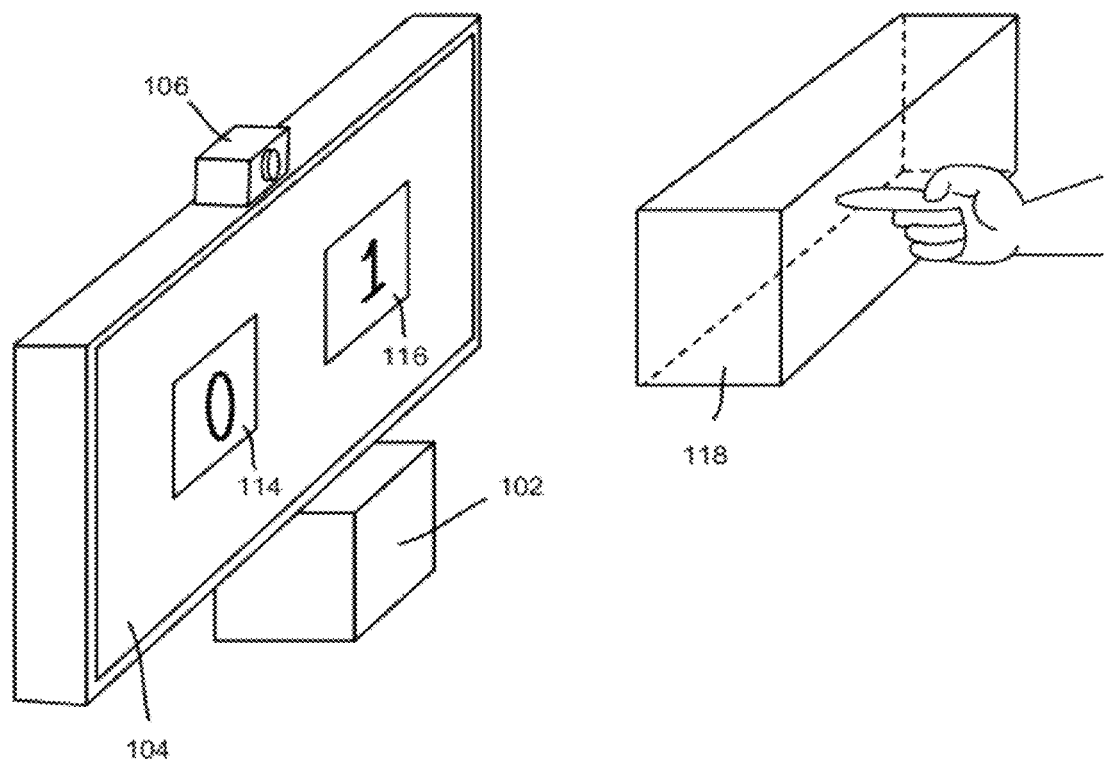
FIG. 1 is an example representation of a user interacting with a gesture detection region based upon depth sensing to interact with a displayed control.
Figure 2:
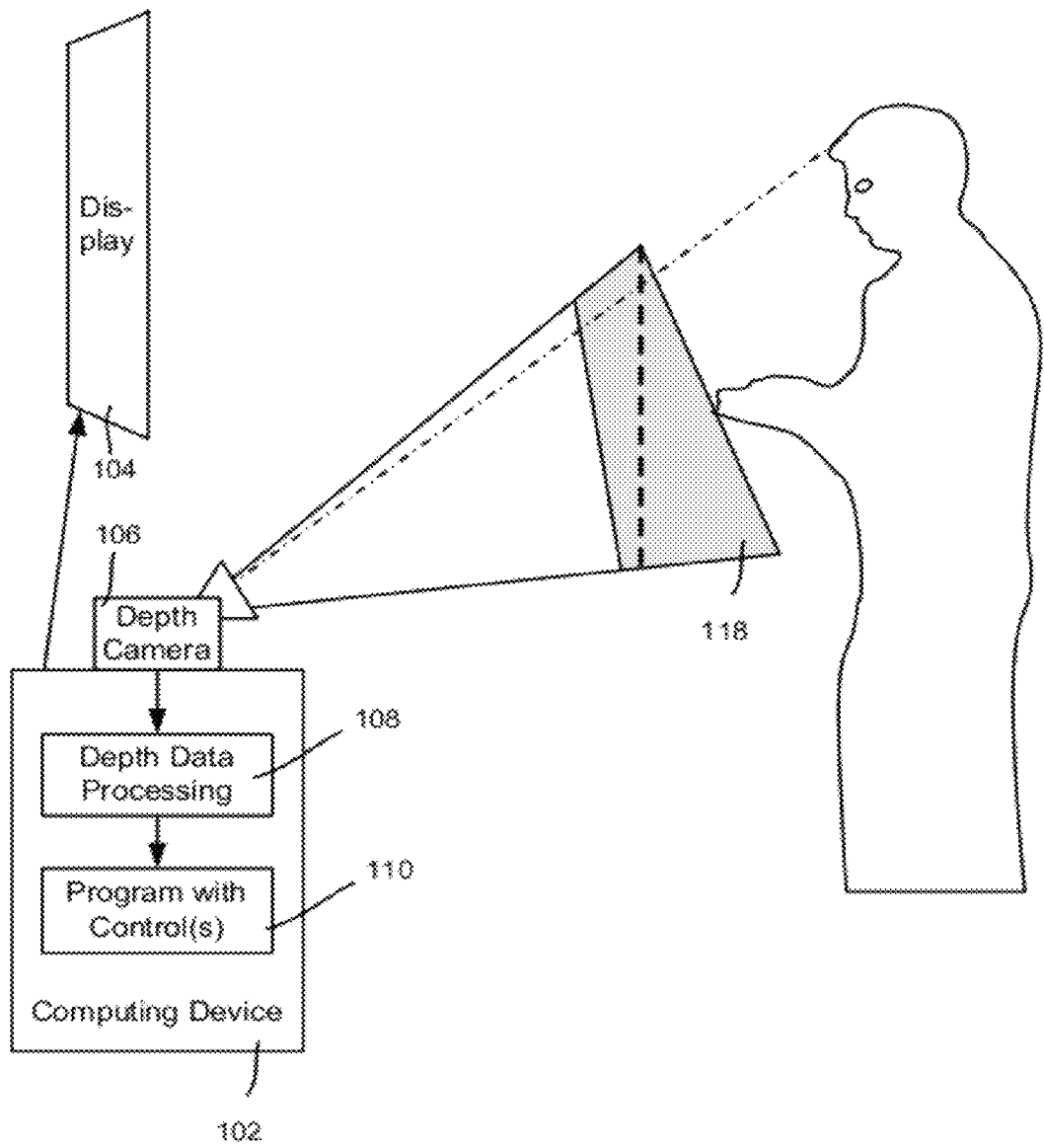
FIG. 2 is an example side-view representation of a user interacting with a gesture detection region to provide information to computing device components.

FIGS. 1 and 2 show general conceptual diagrams in which a computing device 102 is coupled to a display 104 and a depth camera 106. Although FIGS. 1 and 2 show the computing device 102 supporting the display 104, which in turn supports the depth camera 106, alternative configurations are feasible, e.g., the display may incorporate the computing device and/or depth camera in a single housing, the computing device may be a game console aside the display with a depth camera plugged into it, and so on. Further, the computing device, depth camera and/or display components may be incorporated into a device having additional functionality, such as a consumer robot.

As described below, depth data provided by the depth camera 106 is processed by a depth data processing mechanism 108, which in this example includes tracking user hand movements or the like, that is, gestures made with the user hand itself or possibly something held in the hand. As is known, a depth camera captures frames of pixels, with each pixel having a depth coordinate; for example a depth camera that also captures R, G, B video data has four values for each pixel in each frame, e.g., R, G, B and D (depth) values.

A program 110 with interactive controls such as buttons, menu items and so forth generates representations (e.g., 114, 116) of those controls on the display 104, with which the user may interact based upon gestures detected in an interaction region 118. A control may comprise some of the software code/logic that performs some of the operations described herein. In general, the components 108 and 110 comprise a mechanism (subsystem) that performs gesture detection to fire an event as also described herein.

U.S. patent application Ser. No. 13/079,373 entitled "Virtual Touchpad Using a Depth Camera," assigned to the assignee of the present application and hereby incorporated by reference, describes such a volumetric region that is virtually positioned in front of the user, e.g., relative to the user's head position. In general, the user's face and/or head position is detected, including its average depth or the like, and the region positioned and depth-sensed relative to the head position to track hand movements therein. As generally described therein, each hand may be captured as a blob of data that is isolated from any other object (blob) in the virtual touchpad region, with its center of energy computed. The result is an x, y, z coordinate representative of the hand position obtained in real time, which may be posted to a message queue for use by programs, e.g., as conventional mouse or other pointer coordinates are used, with the additional advantage of having a z-coordinate for use as desired.

Figure 3:
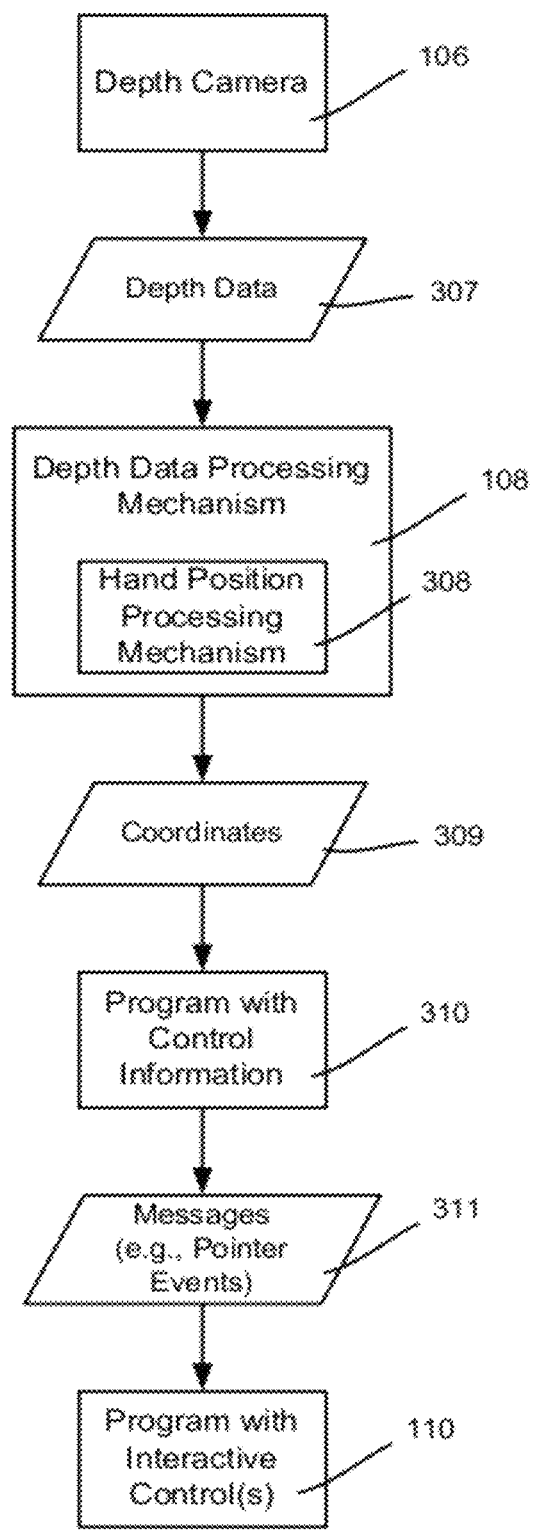
FIG. 3 is a block diagram representing example components used in gesture detection based upon relative user gestures.

FIG. 3 thus summarizes a flow of data through a system in which the depth camera 106 captures depth data 307 for processing by the depth data processing mechanism 108. A hand position processing mechanism 308, e.g., incorporated into (or coupled to) the depth data processing mechanism 108 determines coordinates 309 for each hand. These coordinates may be used to move an "air cursor" on the display 104, for example.

An operating system program 310 or the like with knowledge of the currently represented controls (e.g., their positions and sizes on the display) detects any user gesture-related events relative to those controls, and passes such events as messages 311 to the program 110 (e.g., the application) that has provided the controls for interaction with that program 110. For example, these may be pointer events, such as a mouse-down event as described below with reference to FIGS. 4 and 5.

Note that because the system is designed to interact with gestures from both user hands (and possibly more than two in the same region), thus facilitating concepts like zoom-in and zoom-out via pinching and stretching gestures, conflicts are possible in certain scenarios. For example, unlike the zoom-in or zoom out scenario in which both hand positions are tracked and used and there are no conflicts, many programs are configured to use a single cursor. Any conflicts may be handled by the program 310 and or the program 110 as appropriate. For example, in a typical pointing device-like scenario, only a single air cursor may be allowed, which may be resolved by using an air cursor corresponding to only the user's right hand position (by default), or possibly corresponding to the first hand (in time) to enter the region, and so on.

Figure 4:
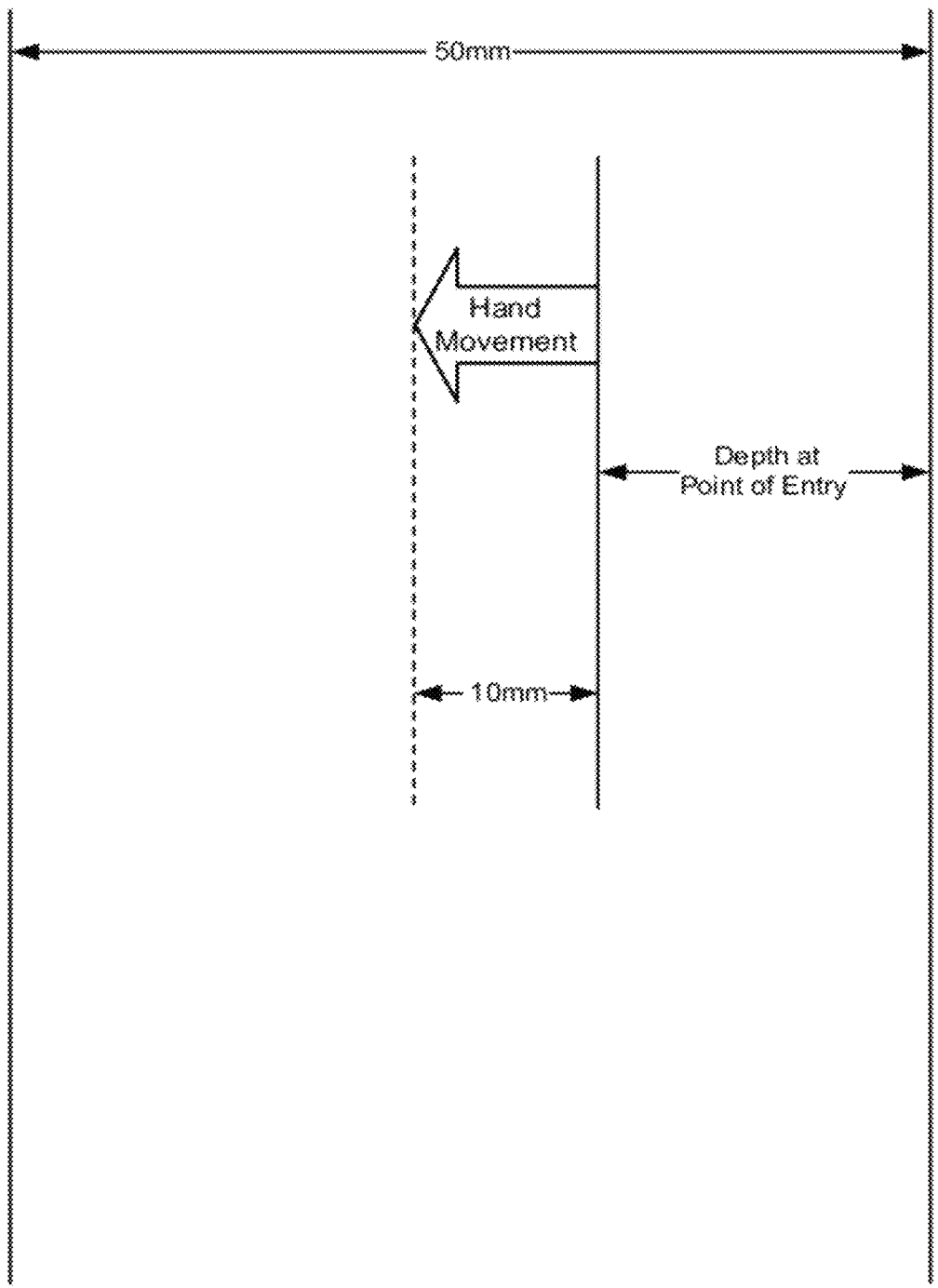
FIG. 4 is an example representation of tracking hand movement relative to a starting depth to determine whether to trigger an event with respect to a displayed control.

Turning to efficient detecting of events in a way that significantly reduces or eliminates inaccurate gesture interpretation, FIG. 4 is a representation of an example 50 millimeter input region from a side view; the region is shown as vertical for simplicity, but may be tilted vertically (as well as horizontally if desired) as generally represented in FIG. 2. Note that traditional approaches to natural user interface inputs use absolute space coordinates, which requires the user to deftly navigate a three-dimensional plane and push towards the camera at the same point to trigger a button, for example. This is difficult for the user and leads to false positives, because the "trigger" depth plane through which the user needs to push to activate the control may be only a relatively very small distance behind the z-coordinate where the user began interacting with the x-y space of the represented control. To reduce this, existing solutions place the depth of the trigger plane towards the back of the region (farthest away from the user in the z-direction), but this is still susceptible to false positives and also has other drawbacks.

Described herein is a natural user control interface (e.g., for keyboard keys, buttons, icons, links and so forth) that is operated by a relatively very small motion, e.g., in a direction toward the camera. To this end, the user can move a hand to enter the two-dimensional space (e.g., area) representing such a control, and may do so at any depth within the region. FIG. 4 shows this first "depth at point of entry" of approximately 18 millimeters in this illustrated example. Note that this may be the center of energy computed from the object (e.g., user hand) in the sub-region corresponding to the displayed control, or may be some other depth value.

In order to engage the control to generate a corresponding event, e.g., a mouse down event, the user needs to move his or her hand towards the camera a relative depth amount, such as 10 millimeters. In other words, this second depth relative to the first depth needs to achieve at least a delta. Note that the delta is fixed in this example, but in other alternatives may be user configurable, or may vary, e.g., the further the initial depth, the smaller the delta (or vice-versa). Thus, the z-coordinates for engagement are not absolute coordinates, but rather relative coordinates, which reduces false positive triggering that otherwise tends to occur when the user enters too near the absolute trigger plane, and thus increases the detection accuracy.

The above engagement action may be enhanced with timing to further reduce false positives and increase the detection accuracy. To this end, before the user can activate a control by relative movement, the user needs to hover over the control (that is, have the air cursor remain in the control's bounding area) for a minimum period of time. In one implementation, a suitable hover time (engagement-ready period) was set to be 150 milliseconds, which is relatively very small from a user's perspective. This reduces false positives that otherwise may result when a user simply moves over keys without intending to engage them, as the user does not remain on such keys long enough.

Other aspects may improve the user experience further. For example, each control's representation (e.g., a keyboard key) may change a visible property in some way (e.g., expand, change color, flash, and the like) on the display when the user hovers over one. For example, a size expansion makes it easier to select (in case the user pushes at an angle rather than straight towards the camera), as well as visibly signaling to the user that the control is ready for activation. Audio and/or tactile feedback may also be used, e.g., one or more audible beeps may be sounded when the user enters the sub-region corresponding to the control, and/or the hover time is reached.

Another option is to track the maximum depth (e.g., where depth is larger the further from the camera) and use a delta (e.g., the 10 millimeters described above) from this maximum to engage the control. The depth may be tracked from the time when the user started hovering over the control, or when the user first entered the control area, or another appropriate time. This allows the user to pull back his or her hand, which increases the maximum depth (e.g., from the initial entry depth or a prior frame's maximum), and then move the hand forward only the delta engagement amount relative to this current maximum. As a more particular example, the user may enter the control area at depth 30 millimeters, pull back the hand to 35 millimeters, and then need only push forward to 25 millimeters to engage the control.

In one implementation, the control itself tracks the maximum depth within its code/logic once the control is engaged. This decouples the gesturing system from having to track the maximum depth for each control. For a control with multiple keys such as a keyboard, the control keeps track of the maximum depth for each key. Each key is engaged after the 150 millisecond time and fires it there is relative movement within the key greater than the threshold.

The above-described engagement/triggering mechanism may be used in combination with other mechanisms. For example, instead of forward hand movement to trigger the control once hovering is detected, the system may be configured such that the user alternatively may trigger the control by continuing to hover over the control for a certain time duration (e.g., for five seconds).

As can be readily appreciated, the above engagement model may also be used in other ways. For example, by sensing release (e.g., via hand pullback) after engagement, various mouse up-related actions may be performed. A user may engage by pushing towards the camera, (mouse down), and once engaged release by pulling back (mouse up), thus allowing double-clicks, dragging, text selection, and so forth as with a conventional pointing device. In another example, a gesture may be sensed by tracking relative changes in minimum depth, and then switching to tracking maximum relative depth, which may be used to trigger an event like double click when both are detected together. The push forward and/or pull back gestures may be reversed for certain applications, e.g., a game application may have the user virtually pull on something to have it operate naturally. A combination of hand gestures may be used to fire events like zoom in, zoom out, rotation, and so forth.

Figure 5:
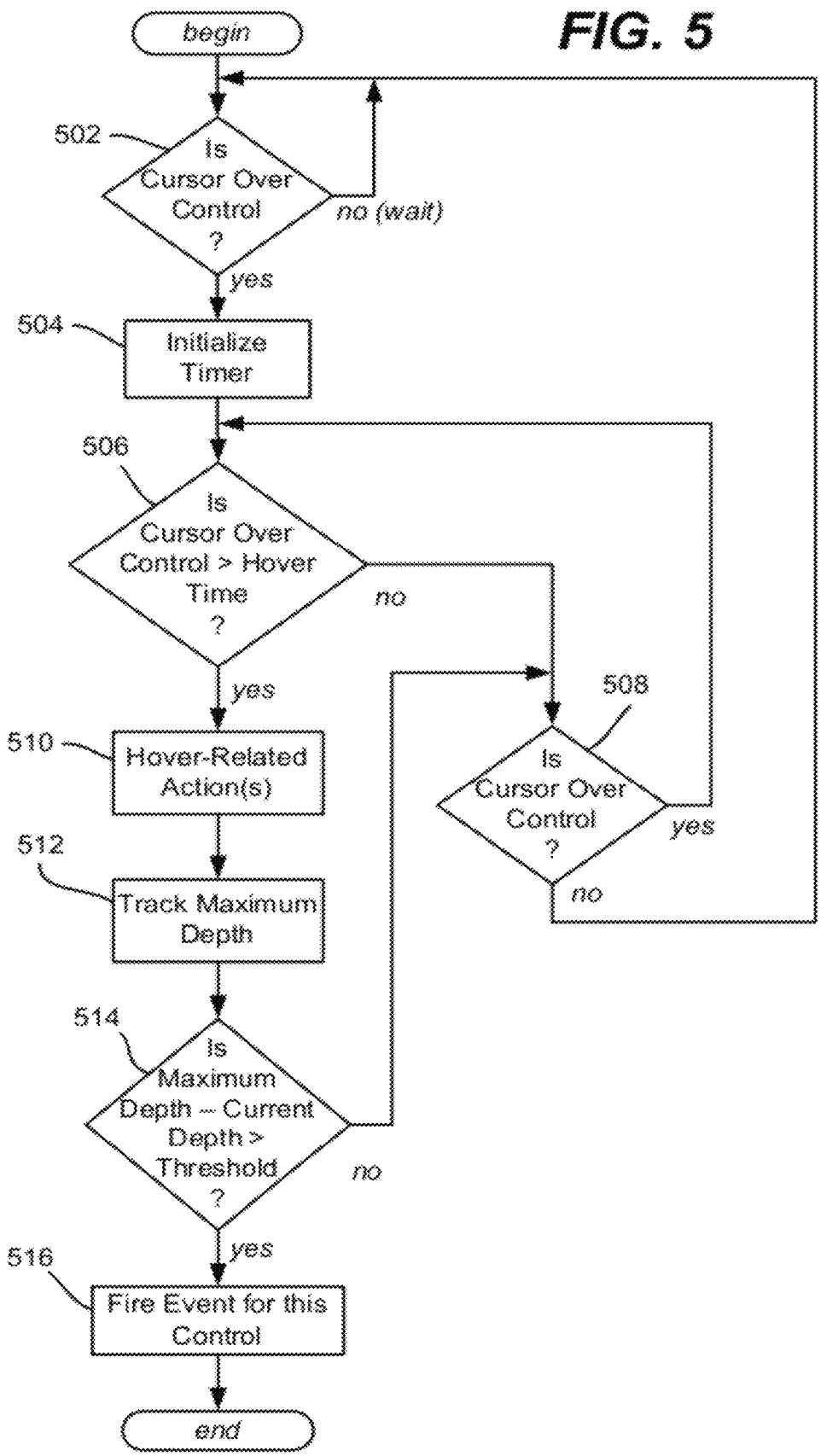
FIG. 5 is a flow diagram showing example steps for relative gesture detection including using hover timing to determine whether to trigger an event with respect to a displayed control.

FIG. 5 summarizes example logic for detecting a push forward engagement operation relative to a displayed control, in which hovering and maximum depth tracking is used. Step 502 represents processing the user's hand position (e.g., corresponding to air cursor coordinates) to determine whether the air cursor has entered the bounds of a displayed control representation. Note that this may be event driven.

Step 504 represents initializing the hover timer that is used to determine whether the user is intending to have the cursor remain in that area. Step 506 checks the time, and if not yet reached, branches to step 508 where the cursor position is re-evaluated to determine if the air cursor is still in the bounding control area or has left it via additional user hand movement. If the cursor has left, the process repeats. Otherwise the hover time continues to be checked.

If the user intends to hover, the engagement-ready period at step 506 is reached, and thus step 506 branches to step 510, which represents performing any hover-related actions. This may include visibly changing the cursor as described above, for example. Note that it is feasible to have different timers and times for the engagement-ready period and any hover effects, (or even no timers), however a single timer and reasonable time such as 150 milliseconds is used in one implementation.

Step 512 represents tracking the maximum depth as described above, which in one implementation is performed in the control, and starts when the hover time is reached, but may occur at the time of entry, or any suitable time. Step 514 checks the delta between the maximum depth and current depth to determine whether and when to fire the event at step 516. This may occur, or the user may move the cursor without engaging, as represented by step 514 branching back to step 508; (note that step 506 need not be performed again once the time has been reached).

As can be seen, there is described a technology for using a relative depth delta, e.g., between a maximum depth and a current depth, to determine when to consider a control engaged. A hover timeout also may be used, which allows for a short threshold for the delta to fire the key.

Exemplary Operating Environment

Figure 6:
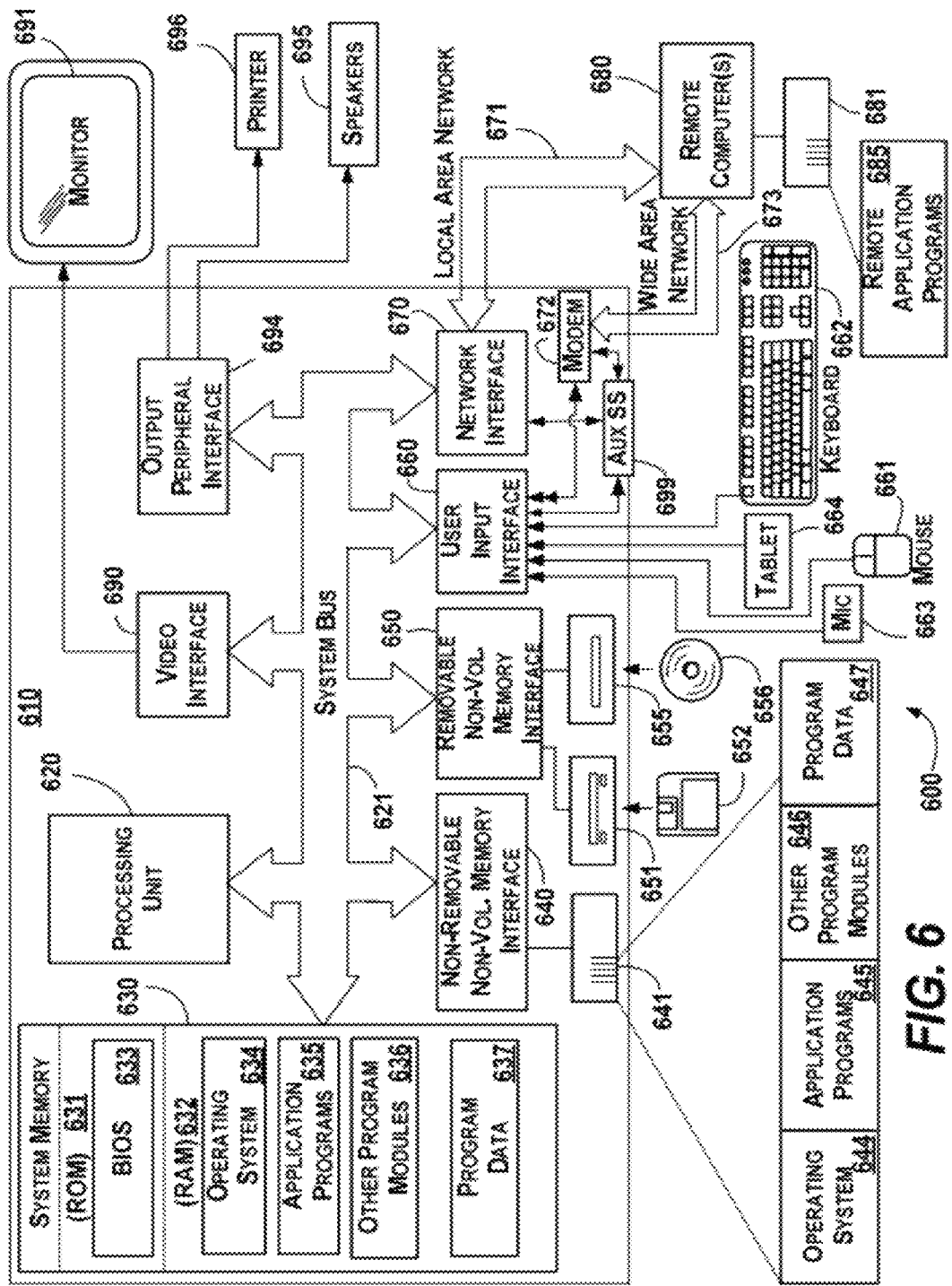
FIG. 6 shows an illustrative example of a computing environment into which various aspects of the present invention may be incorporated.

FIG. 6 illustrates an example of a suitable computing and networking environment 600 on which the examples of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor, comprising:
    receiving depth data associated with one or more frames of pixels, a pixel having a depth coordinate;
    processing the depth data with respect to a depth-sensed region to determine a first depth coordinate based upon an object being present in a sub-region that corresponds to a displayed representation of a control;
    changing at least one visible property of the displayed representation of the control based upon a hover time of the object in the sub-region corresponding to a location of the displayed representation of the control;
    determining whether one or more criteria are met, the one or more criteria including the hover time in which the object remains present in the sub-region and further depth data that indicates whether the object has moved to a second depth coordinate that is relative to the first depth coordinate, said determining comprising tracking a maximum depth of the object by the control, wherein the control tracks the depth data for any gesture made relative to the control, the second depth coordinate is a current depth and the first depth coordinate is the maximum depth, and wherein a delta change from the maximum depth to the current depth fires an event, and wherein the control comprises a plurality of keys, and further comprising:
    tracking the maximum depth for any gesture made relative to a key in the plurality of keys; and
    responsive to the determination that the one or more criteria are met, firing the event.

2. The method of claim 1 wherein processing the depth data with respect to the depth-sensed region to determine the first depth coordinate comprises determining the first depth coordinate based upon an entry point of the object into the sub-region.

3. The method of claim 1 wherein the object comprises a hand, and wherein processing the depth data comprises using center of energy computations to obtain representative coordinates for hand positions in the depth-sensed region.

4. The method of claim 1 further comprising:
    varying the first depth coordinate as the depth data indicates the object has moved further from a depth camera that provides the depth data.

5. The method of claim 1 further comprising:
    starting a timer based upon an entry point of the object into the sub-region corresponding to the displayed representation of the control.

6. The method of claim 1 further comprising:
    determining to fire at least one event based upon multiple object tracking.

7. A system comprising:
    at least one processor;
    a memory communicatively coupled to the at least one processor; and
    a gesture detection mechanism configured to process captured depth data to make a determination to fire an event associated with a control based upon detecting a gesture, the gesture corresponding to reaching a delta change in relative depth values with respect to a displayed representation of the control, wherein the depth data is associated with one or more frames of pixels, a pixel having a depth value, the gesture detection mechanism further comprising the control tracking a maximum depth of the gesture, wherein the control tracks the depth data for any gesture made relative to the control, wherein the delta change in the relative depth values comprises a difference between the maximum depth and a current depth, wherein the control comprises a plurality of keys, and wherein the control tracks the maximum depth for any gesture made relative to a key in the plurality of keys.

8. The system of claim 7 wherein the gesture detection mechanism includes a timer, the gesture detection mechanism configured to not consider the gesture as being detected until the timer reaches a hover time corresponding to hover-related interaction with the displayed representation of the control.

9. The system of claim 8 wherein the gesture detection mechanism starts the timer based upon an entry point of an object into a sub-region corresponding to the displayed representation of the control.

10. The system of claim 7 wherein the gesture detection mechanism is configured to change at least one visible property of the displayed representation of the control based upon hover-related interaction with the displayed representation of the control.

11. The system of claim 7 wherein processing the depth data comprises using center of energy computations to obtain representative coordinates for hand positions in the depth-sensed region.

12. The system of claim 7 wherein the gesture detection mechanism is configured to process the depth data to determine a representative set of coordinates for a position of an object within at least some of the one or more frames of pixels.

13. The system of claim 7 wherein the gesture detection mechanism includes the control, wherein the control comprises a keyboard having the plurality of keys.

14. The system of claim 7 wherein the gesture is made by a hand, and wherein the gesture detection mechanism processes the depth data to determine a representative set of coordinates for a position of the hand within at least some of the one or more frames of pixels.

15. The system of claim 7 wherein the gesture detection mechanism is further configured to determine whether to fire at least one event based upon a combination of a plurality of gestures being detected.

16. The system of claim 7 wherein the gesture detection mechanism processes the depth data to track relative changes in minimum depth, and to track maximum relative depth, to fire at least one event based upon a combination of the relative changes in the minimum depth and the maximum relative depth tracking.

17. One or more computer storage devices having computer-executable instructions, which in response to execution by a computer, cause the computer to perform steps, comprising:
- sensing object position within a depth-sensed region based on depth data associated with one or more frames of pixels, a pixel having a depth value;
- positioning a cursor based upon a sensed object position;
- tracking a maximum depth value of the sensed object position by a control, the control tracking the depth data for any gesture made relative to the control;
- determining whether the cursor remains over a displayed representation of the control for a hover time;
- responsive to a determination that the cursor remains over the displayed representation of the control for the hover time, changing a visible property with respect to the displayed representation of the control;
- determining whether a current depth value based upon the object position changes a relative amount from the maximum depth value while the cursor continues to remain over the displayed representation of the control, wherein determining whether the current depth value based upon the object position changes the relative amount from the maximum depth value further comprises:
  - maintaining a first depth value; and
  - maintaining a second depth value corresponding to the current depth value, wherein determining whether the depth value based upon the object position changes the relative amount comprises computing a difference between the second depth value and the first depth value; and
- responsive to determining that the current depth value changes the relative amount from the maximum depth value, firing an event.

18. The one or more computer storage devices of claim 17 having further computer-executable instructions comprising:
starting a timer based upon an entry point of the sensed object into a sub-region corresponding to the displayed representation of the control.

19. The one or more computer storage devices of claim 17 wherein the control further comprises a keyboard including a plurality of keys.

20. The one or more computer storage devices of claim 19 having further computer-executable instructions comprising:
setting, as the first depth value, the depth value that is sensed in response to Hall the determination that the cursor position is over an area corresponding to the displayed representation of the control.

* * * * *